Figure 1:
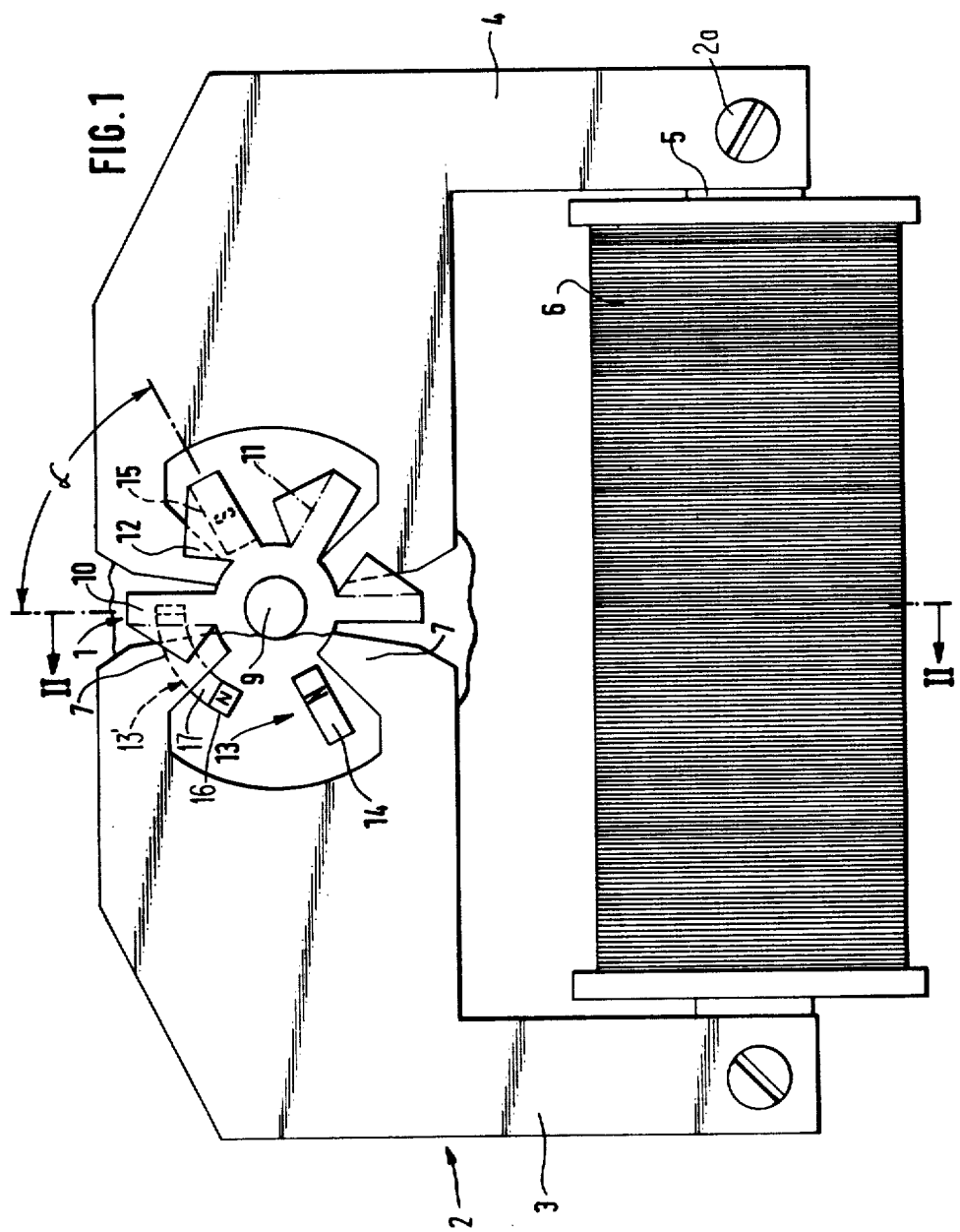

United States Patent [19]

Sudler et al.

[11] 4,206,376
[45] Jun. 3, 1980

[54] SINGLE PHASE STEPPING MOTOR

[75] Inventors: Roland Sudler, Frankfurt; Jean-Francois Schwab, Schwalbach, both of Fed. Rep. of Germany

[73] Assignee: Quarz-Zeit AG, Frankfurt am Main, Fed. Rep. of Germany

[21] Appl. No.: 876,256

[22] Filed: Feb. 9, 1978

[30] Foreign Application Priority Data

Feb. 17, 1977 [DE] Fed. Rep. of Germany ....... 2706651

[51] Int. Cl.² .................................. H02K 37/00
[52] U.S. Cl. ............................... 310/49 R; 310/154; 310/268
[58] Field of Search ................. 310/49, 156, 162–165, 310/268

[56] References Cited

U.S. PATENT DOCUMENTS

| 2,546,729 | 3/1951 | De Millar | 310/49 |
| 3,731,125 | 5/1973 | Nikaido et al. | 310/49 |

Primary Examiner—Donovan F. Duggan
Attorney, Agent, or Firm—Martin A. Farber

[57] ABSTRACT

A single phase stepping motor, particularly for clocks, with a rotor having several pole teeth and a stator, the latter being made of two stator parts connected with one another via a bridge part, the latter carrying the excitation winding, of which each stator part on its free end transfers into an equal or smaller number (in comparison to half the rotor pole number) of stator pole teeth, the stator pole teeth being directed towards the face side of the rotor. Both stator parts are arranged in a first plane at least in the region of the stator pole teeth and the rotor rotates in a second plane parallel thereto. The pole teeth of the rotor each comprises a main pole and an auxiliary pole, the latter extending in the direction of rotation and formed on the main pole, and between the stator pole teeth, there is provided a permanent magnetic circuit, by means of which circuit the rest position of the rotor is determined during the unexcited condition of the stator.

13 Claims, 2 Drawing Figures

SINGLE PHASE STEPPING MOTOR

The invention relates to a single phase stepping motor, particularly for clocks, with a rotor having several pole teeth and a stator, the latter being made of two stator parts connected with one another via a bridge part, the latter carrying the excitation winding, of which each stator part passes on its free end into an equal or smaller number (in comparison to half the rotor pole number) of stator pole teeth, the stator pole teeth being directed toward the face side of the rotor.

One phase stepping motors of this type are already known, by which on the two stator parts, which comprise a high permeable material, there are arranged respectively pole pieces made of pure iron. In the circumferential direction the pole pieces have different heights or levels, whereby main poles and auxiliary poles are formed. The rotor comprises a disc made of a platinum-cobalt alloy with a number of teeth, which respectively are magnetized in the axial direction. The toothed rotor disc rotates between the pole pieces, which pole pieces project from the stator parts towards the face surfaces of the rotor disc. Such type of single phase stepping motors have the advantage that on the basis of the comparatively small air gap between the poles which are axially opposite one another, they have a very small energy consumption and a very high efficiency with small construction volumes.

It is an object of the present invention to further improve these single phase stepping motors with respect to their energy consumption, their efficiency and their construction volumes.

This object is aided in accordance with another object of the invention in the manner that both stator parts (3, 4) lie in a first plane (A) at least in the region of the stator pole teeth (7), and the rotor (1) rotates in a second plane (B) parallel thereto, the pole teeth of which rotor each comprises a main pole (10) and an auxiliary pole (12), the latter extending in the direction of rotation and formed on the main pole, and between the stator pole teeth (7) there is provided a permanent magnetic circuit (13) by means of which circuit the rest position of the rotor (1) is determined or defined with an unexcited stator.

By this measure, with respect to the known single phase stepping motors, the air gap between the stator poles, which poles are opposite one another over the rotor pole teeth, is allowed to be substantially reduced, whereby the efficiency is permitted to increase and the energy consumption is allowed to be reduced. Beyond this the construction height of the motor can be reduced to the extremest amount possible. Since for the rotor no permanent magnetic material is required, instead this can be made of a soft magnetic material (or low retentive material) by stamping or punching out from a sheet metal, and a complicated axial magnetizing of the rotor, as is required with the known motors is completely unnecessary and eliminated. This and the possible use of a stampable material for the rotor considerably simplifies and reduces the price of production of the motor. A particular advantage of the invention resides in that the rotor can be executed substantially thinner than with the known motors, which results in a lower moment of inertia of the rotor and consequently a reduction of the current consumption. A further particular advantage of the single phase stepping motor in accordance with the invention resides in that its direction of rotation simply can be changed by reversed use or insertion of the rotor in its bearing or mounting. By the unipolar control of the motor a further reduction of the current consumption may be achieved, completely aside from the fact that thereby a protection against confusing of the poles can be eliminated and simplifications occur in the control circuit of the motor. Finally, and this is a further special advantage of the motor in accordance with the invention, alone and independent of the parameters of the motor, the holding moment can be changed by variation of the field strength or intensity of the permanent magnetic circuit.

According to one embodiment of the invention the stator pole teeth (7) are formed circularly annular sector-shaped and the rotor has rectangular shaped main poles (10), each of which main poles transfer or pass at a radial limit line (11) into a triangularly-shaped auxiliary pole (12). As it has been shown, with such a motor construction, a particularly favorable efficiency and energy consumption can be achieved with a small construction height or level. A further improvement of these values can be achieved in the manner that the narrow or short side of each rectangular-shaped main pole (10) is approximately equal to the width of a stator pole tooth (7) in the range of the base or foot of the main pole.

A further extensive increase in the efficiency can be achieved in the manner that the stator parts (3, 4, 5) are made of a soft magnetic material (or low retentive material) of low coercive force or retentivity. With the materials, known under the trade names Hyperm, Hyperm 766, Hyperm 800, Hyperm 900 and Hyperm Max., advantageous results could be achieved. These materials are deformable or workable cold so that the stator parts with the main- and auxiliary-poles can be stamped out.

According to one embodiment of the invention the permanent magnetic circuit (13) comprises 2 n ($n = 1, 2, 3 \ldots m$) permanent magnets (14, 15), n of which point with its north pole and the others point with its south pole toward the rotor (1). It was shown that in general two permanent magnets suffice for the construction of the magnetic circuit.

A still advantageous embodiment with respect to its production costs resides in the permanent magnet circuit (13) comprising at least one permanent magnet (14, 15) and a return plate arranged on its side turned away from the rotor (1), the free end of which is offset or displaced with respect to the permanent magnet (14) by at least the angle $\alpha$ of two adjacent rotor poles (10).

It has proven advantageous, in order to achieve a smallest possible construction height or level of the motor to use permanent magnets made of a lanthanide-ferromagnetic alloy. Such type of alloys have a particularly high energy product (BH) max., so that permanent magnets made of this material can be held very small.

A further reduction of the energy consumption of the motor can be achieved by the use of a rotor with a highest possible number of main- and auxiliary-poles. Namely, the higher the number of the rotor poles, the smaller the angle of rotation with each step and the lower can the energy content of the control pulses be. It has proven particularly advantageous to construct the rotor 60 polar and the stator with a smaller pole number. A thus formed motor not only has a most extremely low energy consumption, but beyond that also still has the advantage that since the rotor rotates with a second step, the rotor shaft can be used directly as a seconds shaft. On the basis of functional efficiency it can be suitable to form the stator 10 polar, since with a higher polar stator, the formation of the individual poles can lead to certain difficulties.

According to an advantageous embodiment of the invention the free ends of the main pole are constructed to receive and mount therein a bearing (8) for the rotor shaft (9). This permits, without particular difficulties, an exact alignment of the two stator parts relative to each other, which brings about advantages in efficiency and the energy consumption. Beyond that such a measure possesses functional efficiency or technical production advantages.

Figure 2:
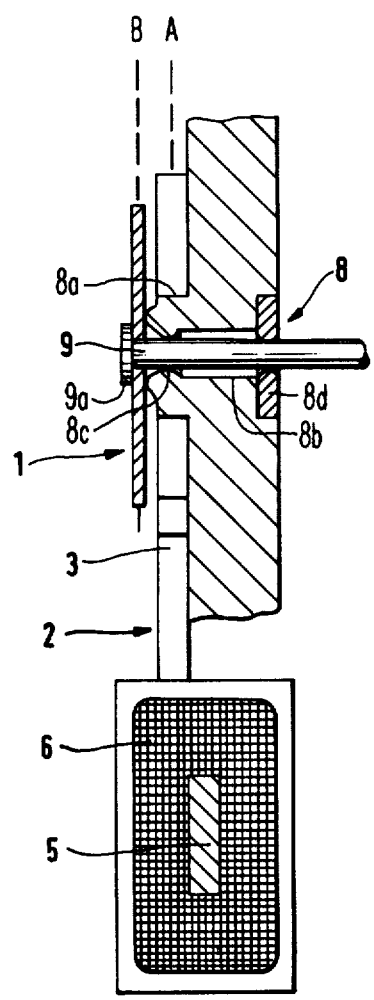

With the above and other objects and advantages in view, the present invention will become more clearly understood in connection with the following detailed description of a preferred embodiment, when considered with the accompanying drawings, of which:

FIG. 1 is a plan view of a single phase stepping motor with a six polar rotor and a four polar stator, partly in section; and FIG. 2 is a section view through the single phase stepping motor according to FIG. 1 taken along the lines II—II;

each in substantially enlarged illustration.

Referring now to the drawings, a single phase stepping motor in accordance with the present invention comprises a six polar rotor 1 and a stator 2, the latter comprising two stator parts 3 and 4 as well as a bridge part 5 connecting these two parts with the excitation coil 6.

Each stator part 3 and 4, respectively, carries on its end adjacent to the rotor 1 two annular sector shaped stator pole teeth 7. The inwardly directed free ends, respectively, of the stator pole teeth 7 of both stator parts 3 and 4 are formed for reception and seating therewithin of a bearing 8 for the rotor shaft 9. The stator pole teeth 7 of the respective stator parts 3 and 4 are formed and arranged relative to each other such that all the inner free ends thereof constitute sectors of a common cylindrical surface, which can engage and retain the cylindrical surface portion 8a of the bearing 8. Adjacent teeth 7 of the two stator parts 3 and 4, respectively, are arranged in the preferred embodiment angularly spaced from each other by the same angle as that of two adjacent rotor poles. As particularly evident from FIG. 2, both stator parts 3 and 4 are arranged in one plane A, whereas the rotor 1 rotates in a plane B which is parallel thereto. The arrangement of the stator pole teeth 7 of/and the respective stator parts 3 and 4 relative to each other is maintained by the screws 2a which connect the stator parts 3 and 4 to the bridge part 5. The stator parts 3, 4 and 5 are produced by stamping out or punching out from a Hyperm-766 plate or sheet metal.

The rotor 1, which likewise is stamped out or punched out from a Hyperm-766 plate or sheet metal is made of six substantially rectangular-shaped main poles 10, which main poles each passes or changes over at a substantially radial limit line 11 into a triangular-shaped auxiliary pole 12. The narrow side of each main pole 10 is selected equal to the width of a stator pole tooth 7 in the range of the base or foot of the main pole. The rotor plate is directly forced or pressed on the rotor shaft 9. The rotor 1 may rotatingly abut the front side of the cylindrical mounting portion 8a of the bearing 8, or the front side of another bearing (not shown) disposed between the bearing 8 and the rotor, which front side is formed planar or with sufficient planar contact points against the rotor 1 to help maintain the parallel orientation of the rotor in the rotor plane B. The bearing 8 is made of a synthetic or plastic material. The rotor shaft 9, which is formed with a collar 9a holding the opposite side of the rotor, rotatably passes through a bore 8b in the bushing or bearing 8. On the side adjacent to the rotor 1, the bore 8b is formed with an inwardly narrowed rounded portion 8c having a circumferential tangent circle equal to the circumference of the rotor shaft 9 for maintaining the precise perpendicular alignment of the rotor shaft 9 in cooperation with a similarly formed annular insert 8d pressed in an enlarged recess in the other side of the bearing 8.

In the unexcited condition the rotor 1 is located in a position as illustrated in FIG. 1. In this position the magnetic resistance of the permanent magnetic circuit 13 is the smallest. Respectively one main pole 10 is then located over one of the two permanent magnets 14 and 15, respectively, of which the magnet with its north pole and the other magnet with its south pole points to the prevailing respective main pole 10. The magnetic field of the permanent magnetic circuit 13 closes across said rotor poles and produces alternating magnet poles on the rotor poles. The auxiliary poles 12 project into the range of the stator poles.

With an excited stator 2 the rotor 1 is rotated by means of the auxiliary poles 12 into a position in which the main poles 10 of the rotor come to lie over the stator pole teeth. Now two auxiliary poles 12 project into the range of the permanent magnetic circuit. As soon as the excitation of the stator is terminated, the rotor 1 is rotated further by the auxiliary poles 12 and the permanent magnets into the illustrated position. In operation pulses are fed to the excitation coil 6 causing the rotor of the single phase stepping motor to undergo its stepwise movement.

For appreciation of the actual dimensions of such a type of motor which is laid out or rated for an operating voltage of less than or equal to 1.5 volts, the following attainable dimensions may be stated: length approximately 9 mm, width approximately 5 mm and height approximately 2.2 mm.

Instead of or in addition to the magnetic circuit 13 there may be provided a permanent magnetic circuit 13' which comprises one permanent magnet 16 made of a lanthanide-ferromagnetic alloy and a return plate or sheet 17 on one end of which the magnet 16 is disposed. The other end of the return plate 17 is displaced with respect to the one end by the angle $\alpha$ of two adjacent rotor poles. The return plate 17 may consist of soft iron.

We claim:

1. In a single phase stepping motor, particularly for clocks, with a rotor having several rotor pole teeth and a stator, the latter being made of two stator parts connected with one another via a bridge part, the latter carrying the excitation winding, of which each stator part transfers on its free end into an equal or smaller number (in comparison to half the rotor pole number) of stator pole teeth, the stator pole teeth respectively being directed towards a face side of the rotor, the improvement wherein both of said stator parts being arranged in a first plane at least in the range of said stator pole teeth, the rotor being rotatably mounted for rotation in a second plane parallel to said first plane, each of said rotor pole teeth of said rotor comprising a main pole and an auxiliary pole, the latter extending in a direction of rotation and formed on said main pole, said rotor and said stator parts are made of a soft magnetic material of low retentivity, a permanent magnetic circuit means being disposed between the stator pole teeth for determining a rest position of the rotor with the stator unexcited, said permanent magnetic circuit means being disposed such that the magnetic field thereof closes across said rotor poles and produces alternating magnet poles on said rotor poles.

2. The single phase stepping motor as set forth in claim 1, wherein said stator pole teeth are formed annular sector shaped and said main poles of said rotor are rectangularly shaped, each of said main poles of said rotor defines a substantially radial limit line, said main poles each transfers on said radial limit line into said auxiliary pole, said auxiliary pole is triangularly shaped.

3. The single phase stepping motor as set forth in claim 2, wherein each of said rectangular shaped main poles has a narrow side, each of said main poles also defines a base portion, said narrow side is approximately equal to the width of said stator pole teeth, respectively, in a range of said base portion of said main pole.

4. The single phase stepping motor as set forth in claim 1, wherein said permanent magnetic circuit means comprises 2 n ($n = 1, 2, 3 \ldots m$) permanent magnets, said permanent magnets each have a south pole and a north pole, respectively, n of said permanent magnets point to said rotor with said north poles thereof, respectively, and the others of said permanent magnets point to said rotor with said south poles thereof, respectively.

5. The single phase stepping motor as set forth in claim 4, wherein said permanent magnets are made of a lanthanide-ferromagnetic alloy.

6. The single phase stepping motor as set forth in claim 1, wherein said permanent magnetic circuit means is made of at least one permanent magnet and a return plate, said at least one permanent magnet has a side thereof facing away from said rotor, said return plate is arranged on said side of said at least one permanent magnet facing away from said rotor, said return plate has a free end displaced relative to said at least one permanent magnet by at least an angle $\alpha$ of two adjacent of said rotor poles.

7. The single phase stepping motor as set forth in claim 6, wherein said at least one permanent magnet is made of a lanthanide-ferromagnetic alloy.

8. The single phase stepping motor as set forth in claim 1, wherein said rotor is formed 60 polar and said stator is formed with a smaller number of poles.

9. The single phase stepping motor as set forth in claim 8, wherein said stator is formed 10 polar.

10. The single phase stepping motor as set forth in claim 1, further comprising a rotor shaft mounts the rotor, a bearing means for said rotor shaft, said stator pole teeth have free ends formed to seat said bearing means.

11. The single phase stepping motor as set forth in claim 10, wherein said free ends of said stator pole teeth of both of said stator parts face radially inwardly and cooperatively constitute sectors of a common cylindrical surface, said bearing means has a cylindrical portion cooperatively seated and secured by said free ends of said stator pole teeth of both of said stator parts, and said rotor shaft rotatably extends through said bearing means.

12. The single phase stepping motor as set forth in claim 1, wherein said stator pole teeth overlappingly face a lateral surface of said rotor poles.

13. The single phase stepping motor as set forth in claim 1, wherein said rotor poles and said stator pole teeth are formed such that in said rest position at least one of said main poles is located over said permanent magnetic circuit means and said auxiliary pole extending from the latter projects into the range of a stator pole.

* * * * *